United States Patent [19]

Malmgren et al.

[11] Patent Number: 5,014,462

[45] Date of Patent: May 14, 1991

[54] SOIL AMENDMENT WITH RUBBER PARTICLES

[75] Inventors: Robert C. Malmgren; Parviz N. Soltanpour; Jan E. Cipra, all of Fort Collins, Colo.

[73] Assignee: International Soil Systems, Inc., Fort Collins, Colo.

[21] Appl. No.: 458,968

[22] Filed: Dec. 29, 1989

[51] Int. Cl.$^5$ .................................................. A01C 1/04
[52] U.S. Cl. .................................... 47/1.01; 47/56; 47/58; 47/DIG. 10; 52/DIG. 9
[58] Field of Search ............. 52/DIG. 9; 47/58, 1.01, 47/9, 56, DIG. 10

[56] References Cited

U.S. PATENT DOCUMENTS

| | | | |
|---|---|---|---|
| 3,713,253 | 1/1973 | Urban | 47/DIG. 10 |
| 3,766,685 | 10/1973 | Nickerson | 47/74 |
| 4,023,506 | 5/1977 | Robey | 47/56 |
| 4,146,381 | 3/1974 | Willisch | 71/14 |
| 4,369,054 | 1/1983 | Shinholster | 47/9 |

FOREIGN PATENT DOCUMENTS 183782 10/1983 Japan ............................. 47/9

OTHER PUBLICATIONS

"Lawn and Ground Covers", ©Sunset Lane Book Company, pp. 17–20.

Primary Examiner—Henry E. Raduazo
Attorney, Agent, or Firm—Dean P. Edmundson

[57] ABSTRACT

Soil amendment techniques are described utilizing solid rubber particles to be mixed with soil to improve porosity and reduce compaction. The rubber particles are preferably derived from shredded scrap tires. The size of the rubber particles may vary, and the amount of rubber mixed with the soil may also vary. The soil amendment techniques are especially useful for reducing compaction of soil under turf (e.g., football fields, soccer fields, golf courses, steeplechase courses, pathways, and the like). The soil amendment also improves soil porosity. Sod grown on soil including rubber particles, and later placed on soil which also includes rubber particles, will reduce certain types of athletic injuries to humans as well as horses. Also, the inclusion of rubber particles in soil improves the use efficiency of water and fertilizer.

19 Claims, 1 Drawing Sheet

SOIL AMENDMENT WITH RUBBER PARTICLES

FIELD OF THE INVENTION

This invention relates to soil amendment. More particularly, this invention relates to amendment or modification of soil to improve air and water passage into the soil. Even more particularly, this invention relates to amendment of soil to improve porosity and to improve root development of grasses and the like which are grown in such soil.

BACKGROUND OF THE INVENTION

Soils in many parts of the world are susceptible to compaction for various reasons (e.g., high clay content, low organic matter content, poor structure, etc.) and consequently do not exhibit good internal drainage characteristics. Also, such soils have poor macroporosity. As a result, root development in these types of soils is restricted due to poor oxygen diffusion and mechanical impedance. Similar problems are exhibited by soils in areas where there is a significant amount of traffic (e.g., athletic playing fields such as football and soccer fields; golf courses; pathways; and the like).

Thus, in areas which are subject to traffic or where soils are susceptible to compaction for various reasons it can be very difficult to grow and maintain healthy grass or sod or other plant species. Although there are commercially available techniques for increasing the porosity of soil in which grass is growing, such as cutting and removing small soil plugs from the area, such techniques can be expensive and time consuming. Furthermore, in order to be effective, the soil plug removal technique must involve a significant percentage of the entire area to be effectively aerated. Also, this technique often must be repeated several times each year or so in order to maintain the desired porosity in the soil.

A further disadvantage of the soil plug removal is that the soil plugs are normally left laying on top of the sod. This results in a messy appearance and could interfere with certain sports activities being conducted on the sod. Removal of the soil plugs from the surface of the sod is possible but it is time-consuming and also expensive.

Another type of aeration technique involves the use of an apparatus which simply punches holes in the ground but does not remove a core or plug. Also, there are slicers which have blades or knives to create a slit in the ground. More recently there have been developed shatter-type aerators as well as aerators which extend as deep as nine inches into the ground.

Renovation of turf grass almost always includes a program of aeration. However, benefits from aeration will only be significant when the right equipment is used at the proper time, including the optimum soil moisture level.

The use of sand as a top dressing has been tried in the past. However, in most cases this tends to produce a negative result.

The optimum time to assure maximum porosity is during the period of soil preparation. At this critical time, attention must be paid to the physical and chemical characteristics of the soil and what amendments can be added to enhance soil structure and porosity. Roots grow in spaces between soil particles and in the pores of larger soil aggregates.

Peat moss has also been added to soil. However, this material is becoming more expensive and there is only a relatively short time over which the peat moss is active in the soil.

For farm crops, soil ripping, slit tilling, sub-soiling and other expensive mechanical techniques are used to improve drainage.

If the soil in which grass or sod is growing does not possess proper porosity and drainage characteristics, then root growth of the grass is restricted. In compacted soils the availability of both water and oxygen as well as other nutrients is low. Therefore, grasses on these soils are subject to stress and become more susceptible to disease and insect infestation. Ultimately the grass will die. Then the soil must be ripped or tilled and new sod laid on top of it, or grass seed and fertilizer must be applied in an attempt to grow new sod. This also is a time-consuming and expensive task.

All too often the quick-fix is resorted to in turf grass management problems. Examples of this are the application of fertilizer, fungicides, insecticides, herbicides, and more irrigation water, thereby potentially causing serious ground water pollution problems. The reason for this is that soil compaction is not easily observed and diagnosed.

Another problem with compacted soils in athletic fields is that the ground is much harder than desired and can cause injuries to players. Thus, compacted soils can also be dangerous to players as well as being detrimental to the growing of grass or sod. Also, compacted soils create hazards for athletes, and horses in equestrian events. In addition to the field hardness per se, soil compaction also reduces the shear strength of the turf causing poor footing for the players and the loss of turf (divots).

SUMMARY OF THE PRESENT INVENTION

The present invention provides techniques for preparing soil to improve porosity and prevent compaction so that grass can be grown in such soil with good root development. Soil which has been amended or prepared in accordance with the techniques of this invention will retain the desired porosity and drainage characteristics for years. Accordingly, grass or sod growing in such soil does not die prematurely.

The soil is amended by first loosening the top layer of soil and then mixing into the soil layer a plurality of solid rubber particles. Preferably the soil is loosened to a depth of at least about 3 inches. The amount of rubber mixed in with the soil is at least about 10% by volume of the soil layer, and it could be added in much greater amounts (e.g., about 30% by volume) where site conditions require it.

Another significant aspect of this invention is that the rubber particles which are useful herein are available from scrap tires (e.g., discarded vehicle tires) by shredding or cutting the tires. Although efforts have been made to minimize the problems of waste tire disposal from a broad variety of vehicles, to date none of these efforts has met with great success. Certainly the rubber industry had attempted to develop uses for the waste product. As an example, the article "Scrap Tires Can Yield Marketable Products" published in 1973, explained efforts by a group called the Rubber Reclaimers Association (an industry consortium) proposed several different uses for the tires including mixing them into asphalt roads and providing crumbs as a foundation base below a house. Neither of these proposals has apparently met with great success. In 1986 a report entitled "Scrap Tire Recycling in California: A Status and Background Report" authored by the California Waste Management Board explained that of all the proposed disposal techniques, direct combustion was the most promising for eliminating the large numbers of scrap tires existing across the nation. Efforts by those focusing upon the disposal problem of scrap tires had even attempted to utilize shredded rubber for stabilization and growth enhancement of soils as detailed in "Evaluation of Combinations of Pine Bark, Peat, Shale, EKOL Leaf Mold, and Shredded Rubber in Growing Media." This article sharply contradicts the present invention in that it concluded that shredded rubber was not effective under certain soil chemical parameters for the desired result and thus rubber/soil mixtures should be avoided. The fact that those focusing on disposal of scrap tires never considered this application discovered by the present inventors underscores how separate and distinct the two fields are.

It should be understood that the present invention focuses upon the use of vulcanized rubber, not foam rubber and not natural rubber. Vulcanized rubber, although containing small amounts of natural rubber, is primarily a solid, non-porous, synthetic product. It differs markedly from foam rubbers and from natural latex rubber in these characteristics. Although efforts have been made to utilize these two products in soil combinations in other technical fields, their properties make them unsuitable with respect to the present invention. Similarly, efforts by those to utilize vulcanized rubber for other purposes have not led those involved in athletic field construction and maintenance to consider this different application. As an example, U.S. Pat. No. 4,369,054 for a "Fiber/Slag Composition" focused upon the possibility of utilizing ground rubber in a broad variety of instances. None of these related to the invention claimed herein.

Other efforts have focused upon playing surfaces. U.S. Pat. No. 4,564,310 for a "Resilient Paving Composition for Playing Fields, Sports Fields and Recreation Areas" discloses the approach of providing an entirely synthetic surface. Although this patent did suggest using finely ground vulcanized rubber such as from scrap tires, the material was used in a manufactured surface. This surface was bonded with latex to provide the paving composition desired. It was not a loose soil surface as in the present invention. Similarly, U.S. Pat. No. 3,446,122 for "Elastic Surfaces for Sportsgrounds, Playgrounds and Footpaths" discloses an entirely manufactured surface which is separate from the dirt layer involved. The material used, polystyrene, is unlike the solid, vulcanized rubber used in the present invention and is not intermixed with earthen material. This is also true of U.S. Pat. No. 4,501,420 for "Playing Surfaces Sports." Although it used vulcanized rubbers such as from scrap tires, it provided a bonded, polymeric material which was not intermixed with earthen material and even had a synthetic turf overlayed upon it. None of these patents disclosed a technique similar to that described herein for soil amendment.

Efforts have been made to improve animal running surfaces using a variety of techniques. In U.S. Pat. No. 3,203,396 for a "Method of and Means for Modifying Race Courses" the need for a resilient surface for a horse track was recognized. Rather than providing a technique for modifying a surface, that disclosure provided a means for separating the track to allow work on the compacted and worn out areas while the other area was used. Finally, in U.S. Pat. No. 4,819,933 for "All Weather Surfaces" the desire to provide a suitable equestrian surface using an intermixture of materials was disclosed. That recent invention focused upon a mixture of sand and synthetic fibers. The synthetic fibers were used in very small percentages (less than 1%) primarily to act as a binder to avoid any loose movement of the surface when in use rather than for resiliency.

In an attempt to reduce surface hardness on horse arenas and tracks a wide array of materials include animal manure, sand, straw, sawdust, wood chips and shavings have been used. However, there are problems associated with the use of these materials. Manure, straw, sawdust, and shavings break down rather fast in the soil and create an additional dust problem over and above that of the soil. This dust source is a severe challenge concerning pulmonary problems with horses. If sand is used it must be washed and must be of a certain size to minimize the dust potential. But if sand is added to soil having a significant percentage of silt and clay it tends to create a mortar-like material in time. Wood chips last longer than manure, straw, sawdust, and shavings, but under comparable conditions have a resiliency 10,000 times smaller in magnitude than vulcanized rubber.

An improved animal running surface is described in our copending application Ser. No. 07/387,496, filed July 28, 1989.

An object of the present invention is to provide means for amending soil to increase porosity, drainage and resiliency of soil so that grass and other plants will not be subject to compaction and water-logging, and so that the probability of injuries to athletes and animals running on such grass surfaces will be reduced.

It is another object of this invention to utilize rubber from scrap tires in an environmentally acceptable manner. The scrap tires are readily available in all areas of the country at a reasonable cost.

The rubber particles used in the techniques of this invention are light-weight, long lasting, and very effective in reducing field hardness and increasing drainage and porosity of the soil. The particles may last as long as 15 years in the soil.

It is therefore another object of this invention to reduce athletic injuries to humans and animals on playing surfaces by the addition of rubber particles to soil to improve the resiliency of the soil.

It is another object of the invention to improve properties of soils in poor sites for plant growth, reforestation, revegetation, etc.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

The availability of good quality topsoil has become limited and its cost is escalating. The use of rubber particles as a means of improving primarily the physical characteristics of the soil increases the macropores of the soil thereby allowing more efficient use of water (either natural rainfall or water applied as irrigation). This will be of increasing importance as water supplies become more costly and in short supply.

The increased porosity of the soil also allows for improved oxygen diffusion to the root system which enhances the root development. This in turn allows for a greater zone from which water and mineral nutrients can be extracted for optimum plant growth. In addition the enhanced root development contribute to a stronger turf with higher shear strength.

Because there are differences in soil types and conditions, each site where the amendment techniques of this invention are to be used must first be examined to determine what the problems are with the soil. Different factors concerning the prior use or treatment of the soil can include the use of fertilizer and other chemicals on the soil and the type and intensity of use to which the site has been subjected. The microbiological characteristics of the site may also be evaluated to determine the need for other soil amendments to optimize soil conditions which will help facilitate good root development.

The types of testing should include pH, for example. If the pH is less than 6.5, then lime should be added to bring the pH to 6.5 or higher. Electrical conductivity of saturation extract should be evaluated to determine if salts should be leached out of the soil profile. If the amount of salts is high, or if the pH is greater than 8.5, then the sodium adsorption ratio (SAR) should be examined to determine if there is a need for gypsum. If the SAR is equal to or greater than 15, then the need for gypsum should be determined.

Addition of rubber to the soil will improve the internal drainage characteristics of the soil and should be done prior to reclamation. The soil profile characteristics should be observed and described according to U.S. Soil Conservation Service criteria. If a compacted layer exists within an eight inch distance from the soil surface, it should be shattered mechanically and then the rubber particles may be added to the soil to a depth of at least two inches below the restrictive layer to prevent the re-formation of the hardpan layer.

Figure 1:
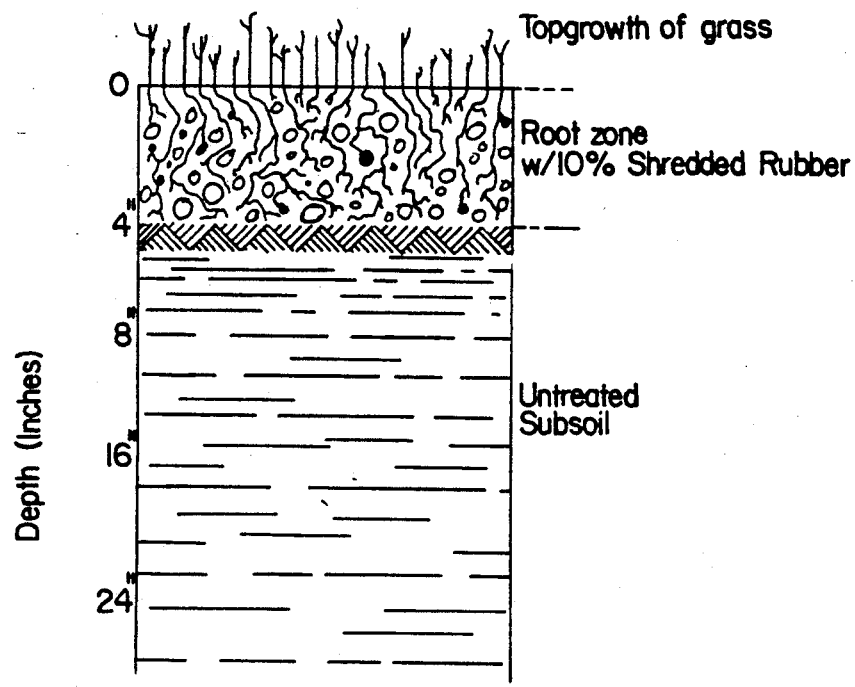
FIG. 1 is a cross-sectional elevational view illustrating one embodiment on oil soil amendment of the present invention.

As illustrated in the appended FIG. 1, the upper or top layer of soil 10 can be loosened and modified by the addition of solid rubber particles 12 thereto. The depth of the upper layer of soil 10 which is modified as described herein may vary, as desired. Normally the upper layer is first loosened to a depth of at least about 3 inches (and preferably 6 inches), after which the rubber particles are added and are mixed with the soil relatively uniformly.

The rubber particles which are useful herein are composed predominantly of vulcanized rubber (e.g., from scrap rubber tires). This rubber is not an open pore, foam rubber, rather it is a solid rubber made of primarily synthetic materials. Although some natural rubber is utilized in creating vulcanized rubber, this percentage is relatively minor. Additionally, it should be noted that natural rubber in a liquid state such as latex does not possess the necessary properties to achieve the ends required by the present invention. Natural latex, occurring in the liquid form, is not sufficiently solid to provide the properties required in this invention.

The soil or earthen material which is mixed with the rubber particles herein normally is indigenous soil. However, it is also possible to use other soil or the like, if desired. For example, it is possible to use materials such as subsoil, topsoil, etc. It is also possible to admix other materials in with the soil, if desired, such as sand, peat, compost, or sewage sludge.

Sand is often thought of as a means of "diluting" a tight clay soil. However, it takes a lot of sand (i.e., washed sand) to effect this. The effect is short-lived, and then more sand must be added.

Peat applied in the proper amounts will favorably improve the water holding capacity of certain soils as well as helping to hold fertilizer for plant root uptake. Peat is becoming more expensive and in some areas of the world there is a ban on its removal due to the loss in value of wetlands. In addition, peat has a relatively short effective life in the soil due to its breakdown by microorganisms.

Sewage sludge may be a useful additive to soil but it is highly variable in heavy metal content and it may contain certain pathogens which can pollute groundwater supplies. Sewage sludge will tend to breakdown in a relatively short period of time. Therefore, by itself, it rapidly loses its value for enhancing soil physical properties.

Peat, sand, and sewage sludge may be included in soil along with the rubber particles if desired. However, the presence of the rubber particles maintains the good porosity and resiliency desired for the improved soil.

The rubber particles which are used in this invention are normally composed of solid, non-porous vulcanized rubber such as is obtained from scrap rubber tires. It is desirable to remove metal fragments (such as are present in steel belted tires). Shredded rubber particles derived from scrap tires are commercially available.

The size of the rubber particles may vary, although preferably the minimum diameter (i.e., the greatest dimension) is at least about 0.25 inch. Generally speaking, the particles should not be larger than about 0.50 inch (longest dimension). Mixtures of particles of different sizes can also be used, if desired.

Rubber particles having a major dimension greater than about 0.50 inch are not normally used. First, it is difficult to remove the metal from rubber particles of this size. Second, large rubber particles are more difficult to uniformly distribute throughout the soil layer.

A mixture of particle sizes often is desirable particularly in the reduction of the cohesive tendency in soils with a significant clay content. The mixture of particle sizes tends to keep the soil loose and minimizes the tendency of the soil particles to stick together.

Preferably the rubber particles are predominantly about 5/16 inch in diameter. This material is readily available at a cost effective price. It is easily spread onto the soil surface and can be easily mixed into the soil at the depth required.

The amount of rubber particles mixed with the soil may vary but in general the rubber particles should comprise at least about 10% by volume of the soil layer and may be present in much greater amounts (e.g., up to about 20% by volume or even more, e.g., 40%, if desired).

The factors which are responsible for determining the amount of rubber particles to be added to the soil are as follows:

1. Climate—Semi-arid and arid zones commonly have a more hostile rooting zone for plants which implies that both chemical and physical parameters must be addressed in determining the amount of rubber particles and the size to be used. For example, in arid and semi-arid regions, lime will cement the soil particles together and in extreme cases will form a caliche layer in soil. The hard caliche layer restricts soil aeration and root growth. After mechanical destruction of this layer the addition of rubber will not permit such a layer to form again. The higher the lime content of the soil the greater the amount of rubber which should be mixed with the soil.

Smaller particles may be included to provide the necessary mineral nutrients which are often lacking in the soils in such regions.

2. Soil type—Soils are mapped according to their inherent characteristics. These characteristics determine, in part, how these soils will respond to certain use and management schemes. Rubber particles can be used to compensate for certain shortcomings of these soils. A low pH, for example, could require the application of ground limestone before rubber particles are added to negate zinc toxicity.

3. Soil condition—The condition that a soil is in is determined largely by the use and management it has been subjected to. A high level of exchangeable sodium, for example, will require the application of gypsum and leaching of sodium. Some soils have been badly abused and are degraded to the point where the amount of soil amendment required may be substantial. In severe cases it may not be cost effective to use any soil amendment.

4. Depth of Compaction—The depth of soil compaction can best be determined by a soil scientist by on-site inspection at several locations. This is determined by evaluating the hardness, porosity and root distribution patterns. Bulk density measurements can also be useful. The more severely compacted soil will require more rubber particles to maintain a suitable matrix which tends to resist cohesion.

5. Intensity of use—Many athletic fields are used beyond their limit or carrying capacity. Higher levels of rubber will be required where this condition exists.

6. Objective—The specific needs must be known, conservation, etc.

The depth or thickness of the soil layer to be modified in accordance with the techniques of this invention may vary, but preferably the thickness is at least about 3 inches. It may be modified to much greater depths, if desired, such as 6–12 inches.

The considerations controlling the depth of the soil layer to be modified are the degree of soil compaction, the depth of soil compaction, and soil texture. Additional factors include the specific use that is intended for the site. Examples are sporting activities such as football, baseball, soccer, tennis, volleyball, rugby, crickett, olympic events, lawn bowling, horse events (e.g., grass running tracks and steeplechase courses), dog tracks, etc. Generally speaking, the greater the depth of soil modified to include rubber particles, the better the soil resiliency.

The rubber particles should be uniformly mixed with the soil after the soil has been loosened. At the same time appropriate organic and inorganic fertilizers and other desired amendments can be mixed with the soil. Then grass seed is gently raked into the soil at an appropriate rate and depth, after which the soil is watered to assure fast seed germination and emergence and optimal sod root formation.

After the sod has matured it can be cut, removed, and then installed in an athletic field, golf course, pathway, road median, lawn, etc. This technique of growing sod on rubber impregnated soil results in a sod of lighter weight than previously available. Another advantage is that less soil is removed from the field when the sod is cut.

Figure 2:
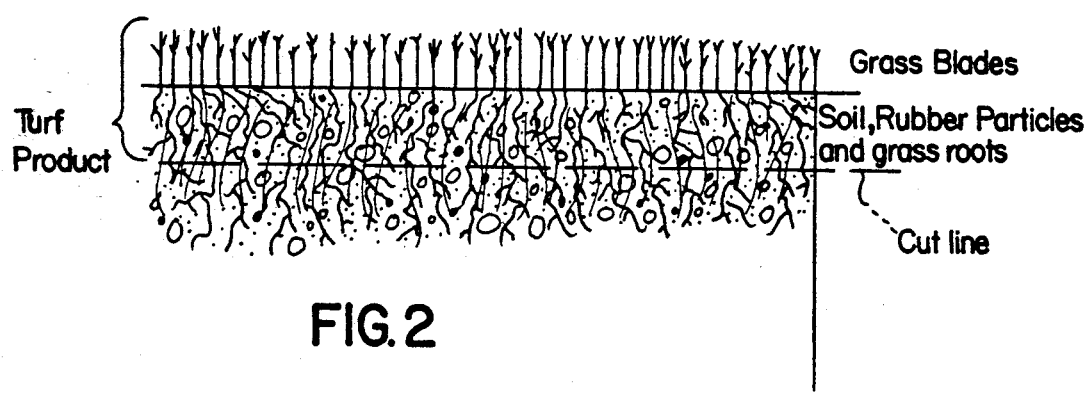
FIG. 2 is a cross-sectional elevational view of another embodiment of the invention.

This technique for growing harvestable sod is illustrated in FIG. 2. Rubber particles are incorporated into the soil in a uniform manner. Fertilizers and other amendments (e.g., lime) are added as dictated by soil analysis. Grass seed is then mixed into the soil at the rates recommended for the particular type(s) of grass seed selected. The soil is then irrigated. After the sod has matured it can be harvested (by cutting along the cut line illustrated) and then installed on an athletic field, residential lawn, commercial lawn, etc., as desired. Preferably the soil over which this turf product is to be installed has been loosened and has had rubber particles incorporated therein.

This technique for growing sod results in a turf product with a rubber cushion comprising soil and rubber particles held together by the grass roots. The presence of the rubber particles ensures against soil compaction and also increases the resiliency of the turf. This helps prevent injuries to athletes and animals. The rubber particles also increase the hydraulic conductivity, permeability, and infiltration rates of the soils.

Preferably the soil on which the sod is to be laid or installed is loosened and admixed with rubber particles as described herein to a depth of at least about 3 inches or more. The amount of rubber particles added to the soil is preferably about 10 to 30% by volume, depending upon the nature of the activities to be performed on the turf.

This method of growing sod assures against soil compaction, a common cause of lawn or grass problems, and minimizes injuries to athletes who play on the turf and animals (e.g., horses) that run on the turf. Thus, growing sod on rubber-treated soil results in a sod with a rubber cushion made by the binding of soil and rubber particles together by grass roots.

This mechanism puts the rubber particles on the surface where athletes make contact with the sod as well as deeper in the soil profile. The rubber reduces the rate of deceleration of the body parts (knees, elbows, shoulders, etc.) upon contact with the ground and thus reduces the frequency and severity of injuries to the athletes and recreational players. Treatment of the soil with rubber particles before laying the sod thereon also increases the resiliency of the field.

The turf or sod product made in accordance with the techniques of this invention also prevents soil compaction due to the presence of the rubber particles and their elasticity. The rubber particles also increase the hydraulic conductivity, permeability, and infiltration rates of the soil.

For soils which contain a significant amount of sand there is an advantage in using rubber particles of smaller diameter (e.g., the size of the sand particles. It is also preferred to adjust the pH of the soil to at least 6.5 (e.g., by adding lime) to avoid problems of acidic soils. This technique tends to increase the water holding capacity of the sand as well as providing an earlier release of certain plant nutrients, which is often critical in sandy soils.

Preferably the rubber particles are mixed in the soil at least to the depth where soil compaction has occurred.

Typically this is at a depth of about 3-5 inches. Incorporation of rubber particles to greater depths (e.g., 6 inches) may be necessary if compaction has occurred to those depths.

The techniques of the present invention are applicable to turfs of all types, particularly athletic turfs, such as football, baseball, soccer, golf, tennis, cricket, lawn bowling, steeple chase courses, horse tracks, dog tracks, volleyball courts, rugby fields, olympic event fields, etc.

Other variants are possible without departing from the scope of this invention.

What is claimed is:

1. A method for preparing soil to improve porosity and prevent compaction thereof, the method comprising the steps of:
   (a) loosening the top layer of said soil to a depth of at least three inches;
   (b) mixing into said layer of soil a plurality of solid rubber particles; wherein said rubber particles comprise at least about 10% by volume of said layer; and
   (c) mixing grass seed into said soil layer.
2. A method in accordance with claim 1, wherein said rubber particles have a diameter of at least about one-fourth inch.
3. A method in accordance with claim 1, wherein said top layer of soil is at least six inches thick.
4. A method in accordance with claim 1, wherein said rubber particles comprise up to about 30% by volume of said layer of soil.
5. A method in accordance with claim 1, wherein said rubber particles comprise shredded tires.
6. A method in accordance with claim 1, wherein said rubber particles are predominantly about five-sixteenths inch in size.
7. A method in accordance with claim 1, further comprising the steps of:
   (a) growing grass from said grass seed in said layer of said soil to form sod; and (b) severing said sod from said soil.
8. A method in accordance with claim 7, further comprising the step of laying said sod on a field to provide an athletic playing surface.
9. A method in accordance with claim 7, further comprising the steps of:
   (a) loosening the top layer of soil of a field; wherein said top layer is at least four inches deep;
   (b) mixing into said layer of soil of said field a plurality of solid rubber particles; wherein said rubber particles comprise at least about 10% by volume of said layer of soil;
   (c) laying said sod on said layer of soil of said field to provide an athletic playing surface.
10. A method in accordance with claim 7, further comprising the step of laying said sod on the ground to provide a pathway.
11. A method in accordance with claim 9, wherein said athletic surface comprises a golf course.
12. A method in accordance with claim 9, wherein said athletic surface comprises a football field.
13. A method in accordance with claim 9, wherein said athletic surface comprises a grass horse track or a steeple chase course.
14. Sod produced in accordance with the method of claim 7.
15. A method for preparing a turf surface comprising the steps of:
   (a) providing a layer of loosened soil having a thickness of at least about 4 inches;
   (b) mixing into said layer of soil a plurality of solid rubber particles, wherein said particles comprise at least about 10% by volume of said layer; and
   (c) applying onto said soil layer a layer of sod.
16. A method in accordance with claim 15, wherein said rubber particles have a diameter of at least about one-fourth inch.
17. A method in accordance with claim 15, wherein said rubber particles comprise up to about 30% by volume of said layer of soil.
18. A method in accordance with claim 15, wherein said rubber particles comprise shredded tire rubber.
19. A method in accordance with claim 15, wherein said rubber particles have a diameter in the range of about one-eighth to 5/16 inch; wherein said soil has a thickness of about 4 to 6 inches; and wherein said rubber particles comprise about 10 to 30% by volume of said soil layer.

* * * * *